US007093274B2

(12) United States Patent
Dawson et al.

(10) Patent No.: US 7,093,274 B2
(45) Date of Patent: Aug. 15, 2006

(54) APPARATUS AND METHOD FOR ACCOMMODATING FAST CHANGE OF DIGITAL STREAMING SOURCES AND FORMATS

(75) Inventors: Thomas P. Dawson, Escondido, CA (US); Priyan Gunatilake, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 222 days.

(21) Appl. No.: 10/630,129

(22) Filed: Jul. 29, 2003

(65) Prior Publication Data

US 2005/0028225 A1 Feb. 3, 2005

(51) Int. Cl.
*H04N 7/173* (2006.01)
(52) U.S. Cl. .................. 725/93; 725/91; 725/98; 725/110; 725/117; 725/118; 725/147
(58) Field of Classification Search .......... 725/86, 725/87, 112, 119, 133, 83, 91, 93, 98, 110, 725/117, 118, 147; 709/219, 228, 249; 370/535, 370/552
See application file for complete search history.

(56) References Cited

U.S. PATENT DOCUMENTS

| 5,729,549 | A | * | 3/1998 | Kostreski et al. | 370/522 |
| 5,768,539 | A | * | 6/1998 | Metz et al. | 709/249 |
| 5,838,314 | A | * | 11/1998 | Neel et al. | 725/8 |
| 6,721,789 | B1 | * | 4/2004 | DeMoney | 709/219 |
| 6,889,385 | B1 | * | 5/2005 | Rakib et al. | 725/119 |
| 2002/0162114 | A1 | * | 10/2002 | Bisher et al. | 725/91 |
| 2003/0229900 | A1 | * | 12/2003 | Reisman | 725/87 |

\* cited by examiner

*Primary Examiner*—Kieu-Oanh Bui
(74) *Attorney, Agent, or Firm*—John P. O'Banion

(57) ABSTRACT

A home video server system includes a source control library and a streaming library. A stream controller is connected between the source control library and the streaming library. Moreover, a plurality of network display terminals can be connected to the streaming library via a network connection. The source control library can choose between a plurality of media sources for streaming video content. When the sources for the streaming video content change, the connection between the network display terminal and the streaming library remains the same.

35 Claims, 3 Drawing Sheets

APPARATUS AND METHOD FOR ACCOMMODATING FAST CHANGE OF DIGITAL STREAMING SOURCES AND FORMATS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to home video server systems, and more particularly to managing video streams provided by home video server systems.

2. Description of Related Art

Televisions are ubiquitous and, in recent years, home video servers that operate in conjunction with televisions have been developed. A typical home video server can provide a variety of media content from various sources to be displayed at one or more televisions.

It is known that the media content can be delivered to a user's television via predefined paths or streams. The paths or streams used to deliver the media content can be built using various protocols (e.g., software modules or "stacks") that are based upon the type of content and the physical transport resources. Switching between the various video sources comprising the media content must be as fast and efficient as possible. However, switching between the video sources can be difficult due to the formats for the video sources, such as analog video, MPEG2 transport stream, MPEG2 program stream, MPEG-4, JVT, and others. Moreover, these video sources can require different resources from the home media server such as a digital encoder for analog video. Formats already in digital format may not require an encoder, but may require a format conversion depending on the requirements of the home media server and its connection to client display devices, such as televisions.

Current practice requires the entire video content stream (protocols, software modules, and/or the "stacks") to be torn down and rebuilt whenever source selection changes. This method was originally used for Internet streaming such as QuickTime and Real Networks. Later, this method was adopted and followed during the development of home media server products such as the NEC AX10, Pioneer DL-000, TiVo and Replay TV by SonicBlue.

Unfortunately, setting up the transport portion for such a connection can require a substantial set of information exchanges between the end user device and the server and as such, it can require an inordinate amount of time to establish the connection.

Accordingly, there is a need for a system and method for preserving the transport portion of the client streaming connection as well as other system resources across stream source selections. The present invention satisfies that need, as well as others, and overcomes deficiencies of prior approaches.

BRIEF SUMMARY OF THE INVENTION

The present invention generally comprises a system and method to take any input source format and give the client the format it wants without breaking the communications link, even if the client switches sources or demands a different source format. The invention separates the resources that comprise the stream source from the resources that maintain the transport connection to the client display. This arrangement allows for the format and resources that make up a content stream to change without breaking the connection to the client display device. The connection to the client is maintained independent of the resources required to produce the stream or the format of the stream itself. The invention creates a separately managed and sustained transport connection to each of the clients of a home media server. This connection is maintained while the source formats and resources needed to package data for the client may change.

An aspect of the invention is to provide a home video server system that includes a source control library, a streaming library, and a stream controller connected between the source control library and the streaming library. In one embodiment, a plurality of network display terminals are connected to the streaming library via network connections. During operation, the connections between the network display terminals and the streaming library do not change in response to source changes within the source control library.

In one embodiment, the source control library includes a source route selection module to which a plurality of media sources, such as audio, visual, or audio/visual sources, are connected. The source route selection module selects which media source provides data to the stream controller. Preferably, the media sources include a plurality of analog video sources, an Ethernet streaming video source, and a hard disk drive. In another embodiment, an iLink (IEEE-1394) connection can provide an additional video source. Other video sources can be included depending on the system requirements.

An analog video decoder is preferably connected to each analog video source. Additionally, an analog source router multiplexer is connected to the analog video decoders. Preferably, the system includes equal numbers of analog video decoders and analog video sources. A digital compression encoder is connected between the analog source router multiplexer and the source route selection module. The multiplexer routes a selected video decoder to a selected digital compression encoder. Further, an Ethernet streaming video interface is preferably connected between the Ethernet streaming video source and the source route selection module. Also, a personal video recorder/file playback (PVR) module is connected between the hard disk drive and the source route selection module.

Preferably, the stream controller includes a streaming module interface package connected to the source route selection module. The stream controller further includes a universal plug and play (UPnP) software stack connected to the streaming module interface package. The network display terminal can access the UPnP software stack via a network connection.

In a preferred embodiment, the streaming library includes a real time streaming protocol/real time transport protocol (RTSP/RTP) streaming module connected to the streaming module interface package. The streaming library also includes a hypertext transfer protocol (HTTP) streaming module connected to the streaming module interface package. Further, the streaming library further includes a user datagram protocol (UDP) streaming module connected to the streaming module interface package. Preferably, the network display terminal is connected to the RTSP/RTP streaming module, the HTTP streaming module, and the UDP streaming module.

Another aspect of the invention is a method for managing video streams provided by a home video server. In this aspect, the method includes receiving a request for streaming content from a network display terminal. A first stream source is selected for the streaming content. A streaming protocol connection is established with the network display terminal. Also, the streaming content from the first source is packetized and the packetized streaming content is transmitted to the network display terminal. When a second stream source is selected, the streaming protocol connection with the network display terminal is maintained.

A still further aspect of the invention is a home video server system that includes a home video server to which a plurality of network display terminals are connected. The system also includes means for receiving a request for streaming content from the network display terminal. Further, the system includes means for selecting a stream source for the streaming content. Moreover, the system includes means for establishing a streaming protocol connection with the network display terminal. In this aspect, the system also includes means for maintaining an established streaming protocol connection with the network display terminal when the stream source changes.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1A:
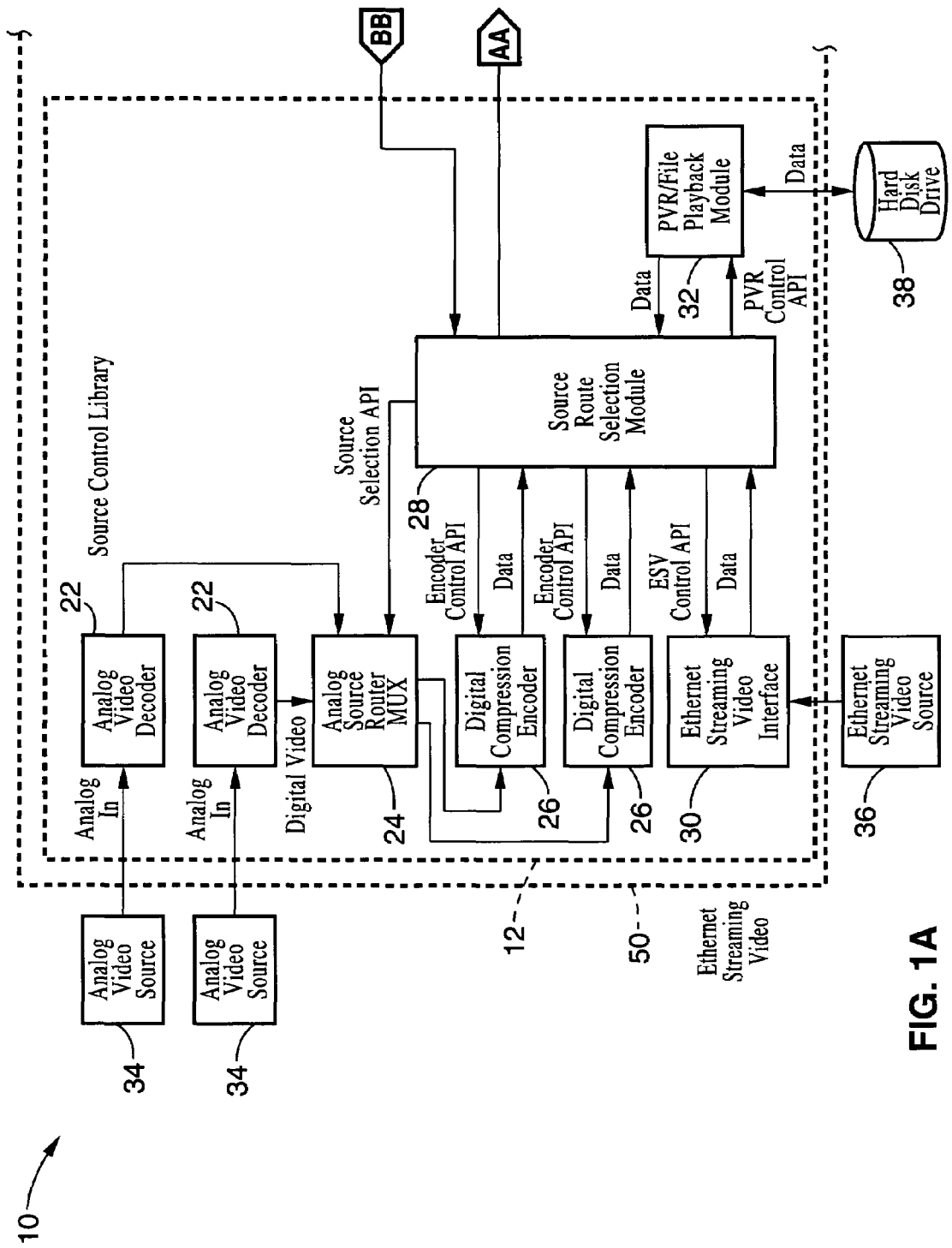
FIGS. 1A–1B is a block diagram of a home media server system according to the present invention.
Figure 1B:
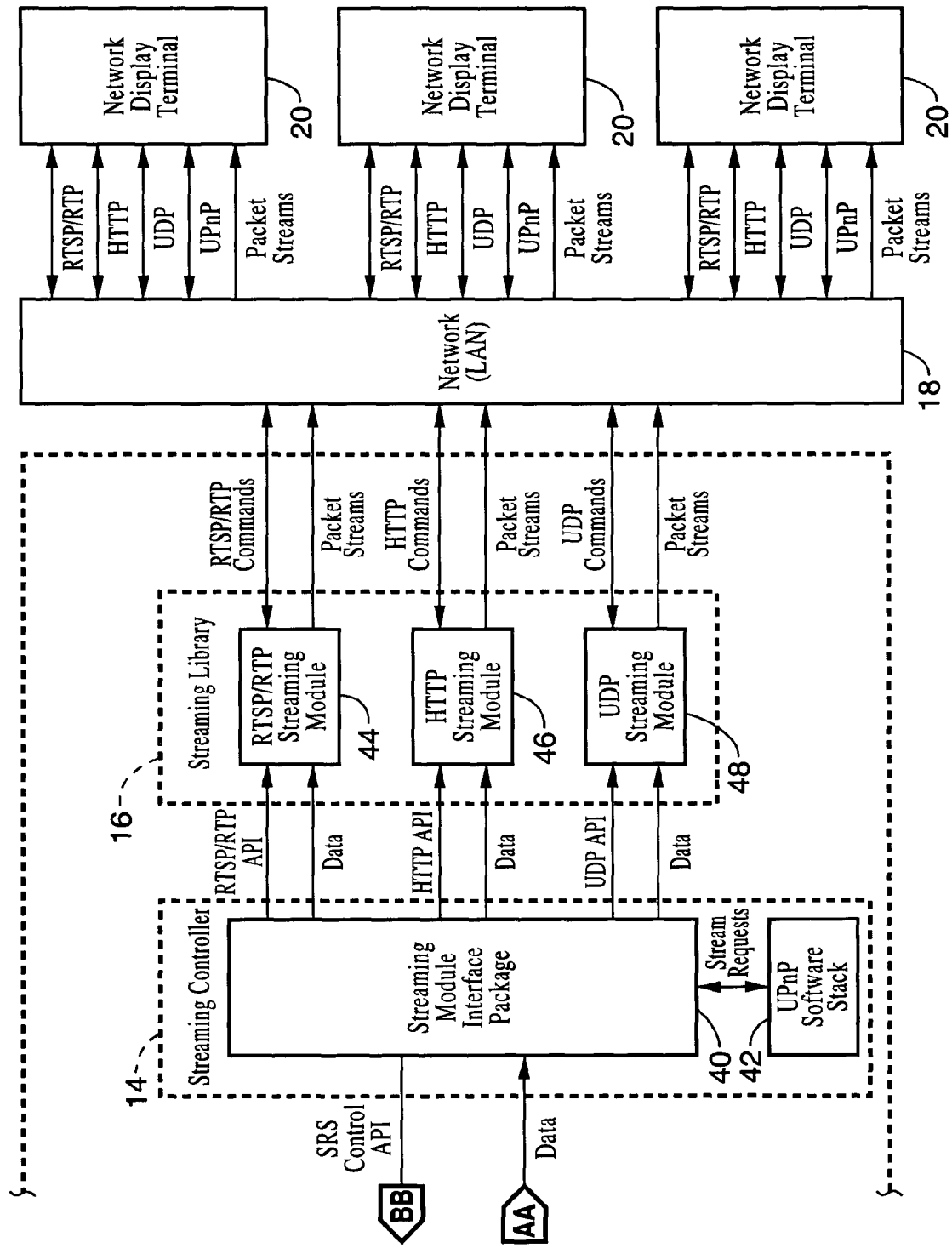
Figure 2:
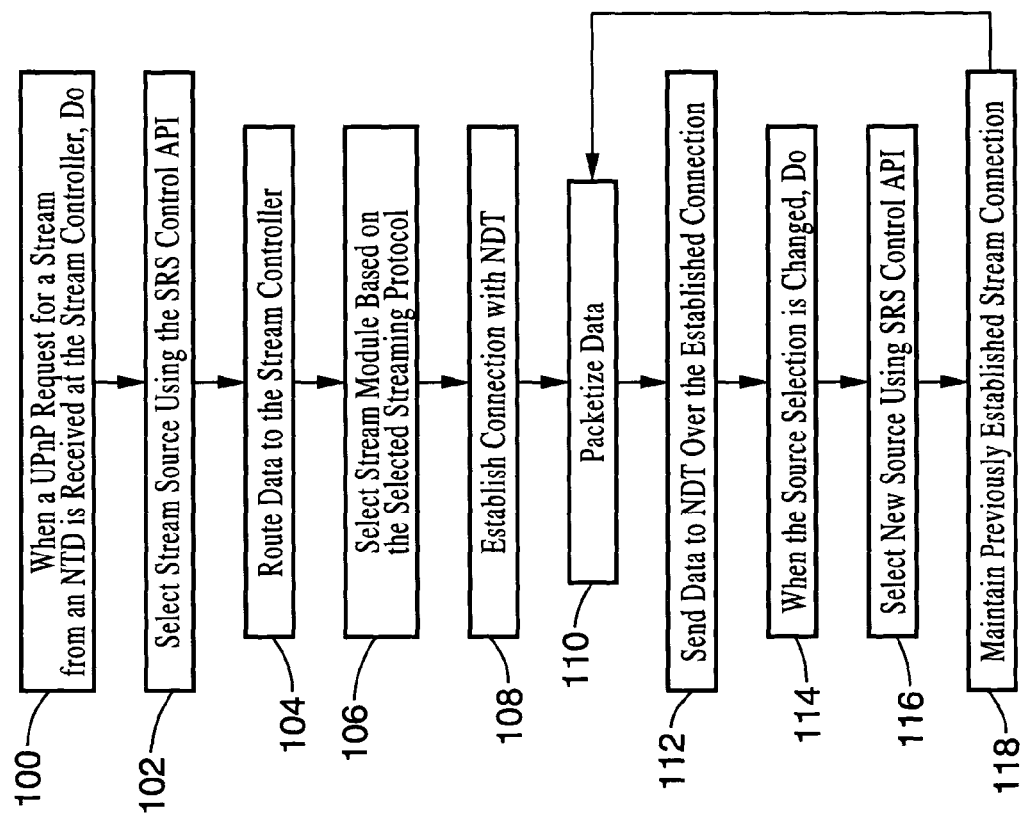
FIG. 2 is a flow chart of the operating logic according to the present invention.

Referring more specifically to the drawings, for illustrative purposes the present invention is embodied in the apparatus generally shown in FIGS. 1A–1B through FIG. 2 and related method(s) of operation. It will be appreciated that the apparatus may vary as to configuration and as to details of the components, and that the method may vary as to the specific steps and sequence, without departing from the basic concepts as disclosed herein.

FIGS. 1A–1B illustrates a home media server system that is generally designated 10. As shown, the system 10 includes a source control library 12 connected to a stream controller 14. In turn, the stream controller 14 is connected to a streaming library 16. FIGS. 1A–1B further shows that the streaming library 12 is also connected to a network 18, such as a local area network (LAN), a wireless local area network (WLAN), a wide area network (WAN), a wireless wide area network (WWAN), a personal area network (PAN), a wireless personal area network (WPAN), or any other network known in the art. As shown, a plurality of network display terminals (NDT) 20 are connected to the network. It can be appreciated that each NDT 20 can be a television, a computer monitor, or any other display device, As described in detail below, it is to be understood that the stream controller 14 can select a streaming module to be used for streaming a video signal to an NDT 20.

As shown in FIGS. 1A–1B, the source control library 12 includes a plurality of analog video decoders 22 that are connected to an analog source router multiplexer (MUX) 24. The analog source muter MUX 24, in turn, is connected to a plurality of digital compression encoders 26 which are connected to a source route selection (SRS) module 28. Further, an Ethernet streaming video interface 30 is connected to the SRS module 28. A personal video recorder (PVR)/file playback module 32 is also connected to the SRS module 28. It is to be understood that the SRS module 28 handles source selection, source switching, and routing of digital data to a streaming module interface package, described below.

FIGS. 1A–1B also shows a plurality of analog video sources 34 that provide analog video signals to respective analog video decoders 22. The analog video decoders 22 convert the analog video signals to digital video signals that are input to the analog source router MUX 24. As shown, the analog source router MUX 24 can be controlled by a source selection application program interface (API) provided by the SRS module 28. FIGS. 1A–1B further shows that the analog source router MUX 24 supplies data signals to the digital compression encoders 26. Each digital compression encoder 26 compresses the signals and sends compressed data signals to the SRS module 28. Preferably, the digital compression encoders 26 can be controlled by an encoder control API from the SRS module 28.

In a preferred embodiment, an Ethernet streaming video source 36 provides an Ethernet streaming video signal to the Ethernet streaming video interface 30 which converts the Ethernet streaming video signal to a compressed digital video data signal and sends the data signal to the SRS module 28. The SRS module 28 can control the Ethernet streaming video interface 30 using an Ethernet streaming video control API that is sent to the Ethernet streaming video interface 30. As further shown in FIGS. 1A–1B, a hard disk drive such as an audio/visual hard disk drive (AV HDD) 38 can provide a compressed digital video data signal to the PVR/File playback module 32. Preferably, the PVR/file playback module 32 sends a compressed digital video data signal to the SRS module 28. Operation of the PVR/file playback module 32 can be controlled by a PVR control API sent to the PVR/file playback module 32 by the SRS module 28. It can be appreciated that other sources can provide content to the SRS module 28. For example, these sources can include an iLink source, a memory stick, an audio/visual (AV) source, or any other media source.

Still referring to FIGS. 1A–1B, the stream controller includes a streaming module interface package 40. A universal plug and play (UPnP) 42 software stack is connected to the streaming module interface package 40. As shown, stream requests are sent between the streaming module interface package 40 and the UPnP software stack 42. Moreover, the streaming module interface package 40 provides a SRS module control API that can be used to control the SRS module 28. The SRS module 26 provides a data signal to the streaming module interface package 40. As described in detail below, the data signal eventually gets packetized and sent along to one or more of the NDTs 20.

As shown In FIGS. 1A–1B, the streaming library 16 includes a real time streaming protocol/real time transport protocol (RTSP/RTP) streaming module 44, a hypertext transfer protocol (HTTP) streaming module 46, and a user datagram protocol (UDP) streaming module 48. Each of these modules 44, 46, 48 are connected to the streaming module interface package 40. Specifically, the RTSP/RTP streaming module 44 receives a data signal and an RTSP/RTP API from the streaming module interface package 40. Moreover, the HTTP streaming module 46 receives a data signal and an HTTP API from the streaming module interface package 40. Also, the UDP streaming module 48 receives a data signal and an UDP API from the streaming module interface package 40.

It is to be understood that, in a preferred embodiment, the streaming module interface package 40 uses these APIs to control the respective modules to which they are sent, i.e., the RTSP/RTP streaming module 44, the HTTP streaming module 46, and the UDP streaming module 48. Further, in a preferred embodiment, for each compressed digital video data signal received at the RTSP/RTP streaming module 44, the HTTP streaming module 46, and the UDP streaming module 48 the data is packetized and time stamped to yield a packet stream that can then be sent, or streamed, to one or more of the NDTs 20 via the network 18 using a selected internet protocol (IP), as described below.

It can be appreciated that the source control library 12, the stream controller 14, and the streaming library 16 can be installed within a home media server 50. The home media server 50 can be accessed by the NDTs 20 via the network 18.

Referring now to FIG. 2, the operating logic of the present invention is shown. It will be appreciated that the operating logic would typically be implemented in software that is executable on a microcomputer or the like. In the embodiment shown, the process commences at block 100 with a do loop, wherein when a UPnP request for a stream from an NDT 20 is received at the stream controller 14, the following steps are performed. Thereafter, at block 102, a stream source is selected using the SRS control API sent from the streaming module interface package 40 to the source route selection module 28. Continuing to block 104, data from the selected source is routed to the stream controller 14, specifically to the streaming module interface package 40. At block 106 a stream module is selected based on the selected streaming protocol. At block 108, a connection with an NDT 20 is established, e.g., via one of the modules 44, 46, 48 within the streaming library 16 and the network 18. Accordingly, the connection can be made via RTSP/RTP, HTTP, or UDP.

Moving to block 110, the data is packetized at one of the modules 44, 46, 48. Then, at block 112, the packetized data is sent to the NDT 20 over the established connection as a packet stream. Proceeding to block 114, when the source selection is changed, the logic moves to block 116 wherein the new source is selected using the SRS control API sent from the streaming module interface package 40 to the source route selection module 28. At block 118, the previously established connection, i.e., the connection established at block 108, is maintained. The logic then returns to block 110 and continues as described above.

It is to be understood that the present invention separates the resources that comprise the stream source from the resources that maintain the transport connection to the client display. This arrangement allows for the format and resources that make up a content stream to change without breaking the connection to a client display device, e.g., an NDT 20. The connection to the NDT 20 can be maintained independent of the resources required to produce the stream or the format of the stream itself. It is to be further understood that the present invention creates a separately managed and sustained transport connection to each of the clients of the home media server 50. This connection can be maintained while the source formats and resources needed to package data for the client can change. It is to be understood that if the connection to the NDT 20 changes, e.g., from HTTP to UDP, the connection can be torn down and rebuilt.

As stated above, in a preferred embodiment, the present invention can be part of a home media server system 10 in which a home content server 50 delivers video streams to multiple NDTs 20 from a selection of stream sources. These stream sources can range from AV equipment plugged into the content server to a hard disk drive of recorded content to a cable connection, a satellite receiver or a connection to the Internet, as well as others.

It can be appreciated that the present invention can be applied to various forms of digital transmission where the resources needed and contents of the digital signal will change.

During operation, when a change from a first source stream to a second source stream, a client connection within the client stream manager performs a source switch, e.g., digital compression encoder 26 to AV HDD 38 and if required, a streaming switch. As these changes occur within the context of the client stream connection with emphasis on resource re-use and minimal StreamWriter (SW) environmental changes to current threads, memory, etc., the overall delay as seen by the client device are minimized. Accordingly, the response time for changes between stream sources is minimized.

Although the description above contains many details, these should not be construed as limiting the scope of the invention but as merely providing illustrations of some of the presently preferred embodiments of this invention. Furthermore, it will be appreciated that the invention is preferably implemented using software, and that the software can be coded using conventional programming techniques in accordance with the description above. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for accommodating a fast change of digital streaming formats or sources in a video server system connected to one or more video display devices over a digital packet-based communications link, comprising:
 a video stream controller; and
 means associated with said video stream controller for,
  establishing a connection between said video server and video display devices based on a protocol having a transport portion and a stream portion,
  changing the format or source of a digital video stream by changing the stream portion of the protocol without changing the transport portion of the protocol;
  wherein stream format or source is chanced without breaking the communications link to the video display device.

2. An apparatus as recited in claim 1, wherein said means comprises:
 a source control library;
 a streaming library;
 wherein said stream controller is connected between said source control library and said streaming library; and
 wherein the digital packet-based communications link between an interconnected video display device and the streaming library does not change in response to a video source or video format change.

3. An apparatus as recited in claim 2, wherein the source control library comprises:
 a source route selection module; and
 a plurality of media sources connected to the source route selection module;
 wherein the source route selection module selects which media source provides data to the stream controller.

4. An apparatus as recited in claim 3, wherein said media sources comprise at least two of the following:
 an analog video source;
 an Ethernet streaming video source; and
 a hard disk drive.

5. An apparatus as recited in claim 3, wherein said media sources comprise a plurality of analog video sources, and further comprising:
 a plurality of analog video decoders, each analog video decoder connected to a respective analog video source;
 an analog source router multiplexer connected to the analog video decoders; and
 a plurality of digital compression encoders connected between the analog source router multiplexer and the source route selection module.

6. An apparatus as recited in claim 3, wherein at least one of said media sources comprises an Ethernet streaming video source, and further comprising:
 an Ethernet streaming video interface connected between the Ethernet streaming video source and the source route selection module.

7. An apparatus as recited in claim 3, wherein at least one of said media sources comprises an audio/visual hard disk drive, and further comprising:
 a personal video recorder/file playback module connected between the hard disk drive and the source route selection module.

8. An apparatus as recited in claim 1, wherein the stream controller comprises:
 a streaming module interface package connected to the source route selection module.

9. An apparatus as recited in claim 8, wherein the stream controller further comprises:
 a universal plug and play (UPnP) software stack connected to the streaming module interface package; and
 wherein the network display terminal accesses the UPnP software stack via a network connection.

10. An apparatus as recited in claim 1, wherein the streaming library comprises:
 at least one real time streaming protocol/real time transport protocol (RTSP/RTP) streaming module connected to the streaming module interface package.

11. An apparatus as recited in claim 10, wherein the streaming library further comprises:
 at least one hypertext transfer protocol (HTTP) streaming module connected to the streaming module interface package.

12. An apparatus as recited in claim 11, wherein the streaming library further comprises:
 at least one user datagram protocol (UDP) streaming module connected to the streaming module interface package.

13. An apparatus as recited in claim 12, wherein the network display terminal is connected to at least one of: the RTSP/RTP streaming module, the HTTP streaming module, and the UDP streaming module.

14. An apparatus for accommodating a change of digital streaming formats or sources in a video server system over a digital packet-based communications link, comprising:
 a video stream controller configured for establishing a connection based on a protocol having a transport portion and a stream portion;
 a source control library configured for changing the format or source of a digital video stream by changing the stream portion of the protocol without changing the transport portion of the protocol;
 a streaming library configured for supporting the transport portion of the protocol; and
 a stream controller connected between the source control library and the streaming library;
 wherein a streaming connection, established between a network display terminal and the streaming library does not change in response to a video source or video format change.

15. An apparatus as recited in claim 14, wherein the source control library comprises:
 a source route selection module; and
 a plurality of media sources connected to the source route selection module;
 wherein the source route selection module selects which media source provides data to the stream controller.

16. An apparatus as recited in claim 15, wherein said media sources comprise at least two of the following:
 an analog video source;
 an analog video source from AV equipment or cable;
 a digital video source;
 an Ethernet streaming video source; and
 an hard disk drive.

17. An apparatus as recited in claim 15, wherein said media sources comprise a plurality of analog video source, and further comprising:
 a plurality of analog video decoders, each analog video decoder connected to a respective analog video source;
 an analog source router multiplexer connected to the analog video decoders; and
 a plurality of digital compression encoders connected between the analog source router multiplexer and the source route selection module.

18. An apparatus as recited in claim 15, wherein at least one of said media sources comprises an Ethernet streaming video source, and further comprising:
   an Ethernet streaming video interface connected between the Ethernet streaming video source and the source route selection module.

19. An apparatus as recited in claim 15, wherein at least one of said media sources comprises an audio/visual hard disk drive, and further comprising:
   a personal video recorder/file playback module connected between the hard disk drive and the source route selection module.

20. An apparatus as recited in claim 14, wherein the stream controller comprises:
   a streaming module interface package connected to the source route selection module.

21. An apparatus as recited in claim 20, wherein the stream controller further comprises:
   a universal plug and play (UPnP) software stack connected to the streaming module interface package; and
   wherein the network display terminal accesses the UPnP software stack via a network connection.

22. An apparatus as recited in claim 14, wherein the streaming library comprises:
   at least one real time streaming protocol/real time transport protocol(RTSP/RTP) streaming module connected to the streaming module interface package.

23. An apparatus as recited in claim 22, wherein the streaming library further comprises:
   at least one hypertext transfer protocol (HTTP) streaming module connected to the streaming module interface package.

24. An apparatus as recited in claim 23, wherein the streaming library further comprises:
   at least one user datagram protocol (UDP) streaming module connected to the streaming module interface package.

25. An apparatus as recited in claim 24, wherein the network display terminal is connected to at least one of: the RTSP/RTP streaming module, the HTTP streaming module, and the UDP streaming module.

26. A method for managing video streams provided by a home video server, comprising:
   receiving a request for streaming content from a network display terminal;
   selecting a first stream source for the streaming content;
   establishing a transport portion of a streaming protocol connection with the network display terminal;
   packetizing the streaming content from the first source according to a first streaming format;
   transmitting packetized streaming digital content over said transport portion of said streaming protocol connection to the network display terminal; and
   preserving the transport portion of the streaming protocol connection with the network display terminal when a second stream source is selected, or when packetizing is selected according to a second streaming format.

27. A method as in claim 26, further comprising:
   selecting a second source for the streaming content;
   packetizing the streaming content from the second source; and
   transmitting packetized digital streaming content to the network display terminal over said transport portion of the streaming protocol connection established to transmit the streaming content from the first source.

28. A method as in claim 26, wherein the request for streaming content is received at a stream controller, the stream controller comprising:
   a streaming module interface package; and
   a universal plug and play (UPnP) software stack connected to the streaming module interface package.

29. A method as in claim 28, wherein the request for streaming content comprises a UPnP request that is received at the UPnP software stack.

30. A method as in claim 26, wherein a stream source is selected using a source route selection module, the source route selection module being connected to a plurality of media sources.

31. A method as in claim 30, wherein the media sources comprise at least two of the following:
   an analog video source;
   an Ethernet streaming video source; and
   a hard disk drive.

32. A method as in claim 26, wherein the streaming protocol connection with the network display terminal is established via a real time streaming protocol/real time transport protocol (RTSP/RTP) streaming module.

33. A method as in claim 26, wherein the streaming protocol connection with the network display terminal is established via a hypertext transfer protocol (HTTP) streaming module.

34. A method as in claim 26, wherein the streaming protocol connection with the network display terminal is established via a user datagram protocol (UDP) streaming module.

35. A home video server system, comprising:
   a home video server configured for digital packet-based communication with at least one network display terminal;
   means for receiving a request for streaming content from the network display terminal;
   means for selecting a stream source for the streaming content;
   means for establishing a streaming protocol connection with the network display terminal;
   wherein said streaming protocol is configured with a transport portion and a stream portion; and
   means for preserving a transport portion of the streaming protocol connection with the network display terminal when the stream source or format changes.

\* \* \* \* \*